(12) United States Patent
Geshi et al.

(10) Patent No.: US 12,512,537 B2
(45) Date of Patent: Dec. 30, 2025

(54) BATTERY

(71) Applicants: PANASONIC CORPORATION, Osaka (JP); SANYO ELECTRIC CO., LTD., Osaka (JP)

(72) Inventors: Shinya Geshi, Osaka (JP); Oose Okutani, Hyogo (JP)

(73) Assignees: PANASONIC HOLDINGS CORPORATION, Osaka (JP); PANASONIC ENERGY CO., LTD., Osaka (JP)

( * ) Notice: Subject to any disclaimer, the term of this patent is extended or adjusted under 35 U.S.C. 154(b) by 0 days.

(21) Appl. No.: 17/045,282

(22) PCT Filed: Mar. 27, 2019

(86) PCT No.: PCT/JP2019/013451
§ 371 (c)(1),
(2) Date: Oct. 5, 2020

(87) PCT Pub. No.: WO2019/194055
PCT Pub. Date: Oct. 10, 2019

(65) Prior Publication Data
US 2021/0175568 A1 Jun. 10, 2021

(30) Foreign Application Priority Data

Apr. 6, 2018 (JP) .................................. 2018-074196
Apr. 6, 2018 (JP) .................................. 2018-074199

(51) Int. Cl.
*H01M 50/107* (2021.01)
*H01M 50/152* (2021.01)
(Continued)

(52) U.S. Cl.
CPC ....... *H01M 50/107* (2021.01); *H01M 50/152* (2021.01); *H01M 50/184* (2021.01); *H01M 50/186* (2021.01)

(58) Field of Classification Search
CPC ............. H01M 50/184; H01M 50/152; H01M 50/147; H01M 50/183; H01M 50/186; H01M 50/107; H01M 50/167
See application file for complete search history.

(56) References Cited

U.S. PATENT DOCUMENTS 3,713,896 A 1/1973 Feldhake
6,120,564 A * 9/2000 Marukawa ............ H01M 50/51
439/500
(Continued)

FOREIGN PATENT DOCUMENTS

CN 1275249 A 11/2000
CN 101916832 A 12/2010
(Continued)

OTHER PUBLICATIONS

Espacenet machine translation of KR-20090126094-A (Year: 2009).*
(Continued)

*Primary Examiner* — Susan D Leong
(74) *Attorney, Agent, or Firm* — Rimon P.C.

(57) ABSTRACT

A battery including: a battery can including a cylindrical portion, a bottom wall closing one end of the cylindrical portion, and an open rim continuing to the other end of the cylindrical portion; an electrode body housed in the cylindrical portion; and a sealing body fixed to the open rim so as to seal an opening defined by the open rim. The sealing body includes a sealing plate, and a gasket disposed at a peripheral portion of the sealing plate. The gasket has an inner ring portion disposed on the peripheral portion on a side facing the electrode body, an outer ring portion disposed on the peripheral portion on a side opposite to the side facing (Continued)

the electrode body, and a side wall portion covering an end surface of the peripheral portion. The sealing plate and the gasket are integrally molded to be in close contact with each other.

13 Claims, 9 Drawing Sheets

(51) Int. Cl.
  *H01M 50/184* (2021.01)
  *H01M 50/186* (2021.01)

(56) References Cited

U.S. PATENT DOCUMENTS

| | | | |
|---|---|---|---|
| 6,274,267 B1 | 8/2001 | Pate | |
| 6,524,739 B1* | 2/2003 | Iwaizono | H01M 50/562 |
| | | | 429/185 |
| 2004/0033417 A1* | 2/2004 | Wu | H01M 50/152 |
| | | | 429/185 |
| 2004/0121229 A1* | 6/2004 | Kim | H01M 50/167 |
| | | | 29/623.2 |
| 2007/0154781 A1* | 7/2007 | Choi | H01M 50/193 |
| | | | 429/174 |
| 2008/0081252 A1* | 4/2008 | Miyazaki | H01M 50/502 |
| | | | 429/149 |
| 2013/0216870 A1 | 8/2013 | Kim et al. | |
| 2013/0236757 A1 | 9/2013 | Tikhonov et al. | |
| 2015/0194644 A1* | 7/2015 | Jung | H01M 50/171 |
| | | | 429/56 |
| 2015/0364734 A1 | 12/2015 | Kunoike et al. | |
| 2017/0110699 A1 | 4/2017 | Kohira et al. | |
| 2018/0062122 A1 | 3/2018 | Lee et al. | |
| 2020/0083494 A1* | 3/2020 | Bae | H01M 50/10 |

FOREIGN PATENT DOCUMENTS

| | | | |
|---|---|---|---|
| CN | 102347512 A | | 2/2012 |
| CN | 106030850 A | | 10/2016 |
| CN | 107851746 A | | 3/2018 |
| JP | S50-005831 U | | 1/1975 |
| JP | H07-105933 A | | 4/1995 |
| JP | H8-339785 A | | 12/1996 |
| JP | H08-339785 A | | 12/1996 |
| JP | H09-306443 A | | 11/1997 |
| JP | 2863591 B2 | | 3/1999 |
| JP | 2000-182580 A | | 6/2000 |
| JP | 2002-141028 A | | 5/2002 |
| JP | 2009-295401 A | | 12/2009 |
| JP | 2012-518890 A | | 8/2012 |
| JP | 2013-542567 A | | 11/2013 |
| JP | 6254102 B2 | | 12/2017 |
| KR | 20090126094 A | * | 12/2009 |
| WO | 2010/098923 A1 | | 9/2010 |
| WO | 2010/098924 A1 | | 9/2010 |
| WO | 2012/124187 A1 | | 9/2012 |

OTHER PUBLICATIONS

International Search Report and Written Opinion issue in International Patent Application No. PCT/JP2019/013451, dated Jun. 4, 2019; with partial English translation.
Extended European Search Report dated Mar. 31, 2021 issued in corresponding European Patent Application No. 19782082.2.
Chinese Office Action dated Mar. 18, 2023 with its partial English translation issued in the corresponding Chinese Patent Application No. 201980023776.6.
Chinese Office Action dated Aug. 3, 2022 with its partial English translation issued in the corresponding Chinese Patent Application No. 201980023776.6.
Notice of Reasons for Refusal dated Nov. 19, 2024 issued in the corresponding Japanese Patent Application No. 2023-037663.

* cited by examiner

BATTERY

CROSS-REFERENCE OF RELATED APPLICATIONS

This application is the U.S. National Phase under 35 U.S.C. § 371 of International Patent Application No. PCT/JP2019/013451, filed on Mar. 27, 2019, which in turn claims the benefit of Japanese Application No. 2018-074196, filed on Apr. 6, 2018 and Japanese Application No. 2018-074199, filed on Apr. 6, 2018, the entire disclosures of which Applications are incorporated by reference herein.

TECHNICAL FIELD

The present invention relates to a battery including an electrode body and a battery can housing the electrode body.

BACKGROUND ART

For sealing the opening of a battery can after housing an electrode body in the battery can, typically, a groove is formed first in a battery case (battery can), as disclosed in Patent Literature 1. Then, a gasket and a sealing plate are inserted into the opening of the battery case, and with the outer periphery of the sealing plate covered with gasket, the rim above the groove of the battery can is crimped inward.

CITATION LIST

Patent Literature

[PTL 1] Japanese Laid-Open Patent Publication No. H7-105933

SUMMARY OF INVENTION

Technical Problem

However, according to the sealing method as disclosed in Patent Document 1, since the gasket and the sealing plate are used in combination as a sealing body, there is a necessity of taking into account an assembling tolerance that occurs during the sealing process. For example, when covering the periphery of the sealing plate with the gasket, and when pressing the periphery and the gasket to bring them into close contact with each other after covering the periphery of the sealing plate with the gasket, the position of the gasket contacting the periphery tends to be varied. Therefore, with such variation taken into account, the shape, size, and the like of the sealing plate and the gasket needs to be designed.

Solution to Problem

One aspect of the present invention relates to a battery including: a battery can including a cylindrical portion, a bottom wall closing one end of the cylindrical portion, and an open rim continuing to the other end of the cylindrical portion; an electrode body housed in the cylindrical portion, and a sealing body fixed to the open rim so as to seal an opening defined by the open rim, the sealing body including a sealing plate, and a gasket disposed at a peripheral portion of the sealing plate, the gasket having an inner ring portion disposed on the peripheral portion on a side facing the electrode body, an outer ring portion disposed on the peripheral portion on a side opposite to the side facing the electrode body, and a side wall portion covering an end surface of the peripheral portion, the sealing plate and the gasket being integrally molded to be in close contact with each other.

Advantageous Effects of Invention

According to the present invention, the assembling tolerance that occurs during the battery sealing process can be reduced, which can increase the flexibility in battery design.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
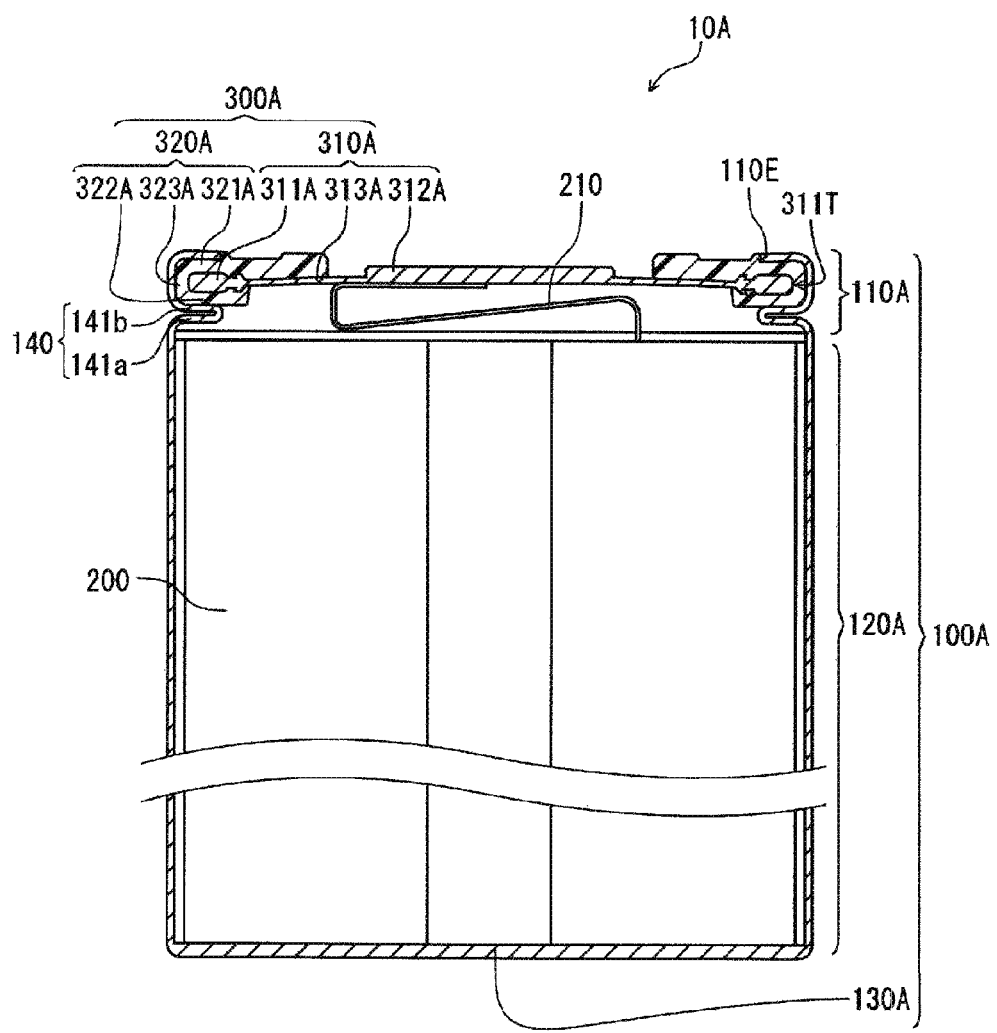
FIG. 1 A schematic vertical cross-sectional view of an essential part of a battery according to an embodiment of the present invention.

A battery according to the present embodiment includes: a battery can including a cylindrical portion, a bottom wall closing one end of the cylindrical portion, and an open rim continuing to the other end of the cylindrical portion; an electrode body housed in the cylindrical portion, and a sealing body fixed to the open rim so as to seal an opening defined by the open rim. The sealing body includes a sealing plate, and a gasket disposed at a peripheral portion of the sealing plate. The sealing plate and the gasket are integrally molded to be in close contact with each other.

In the following, a direction from the sealing body toward the electrode body is referred to as a downward direction, and a direction from the electrode body toward the sealing body is referred to as an upward direction. In general, when the battery can is placed upright with the bottom side down, a direction parallel to the axis of the cylindrical portion and toward the open rim is the upward direction.

Conventionally, for sealing the open rim of the battery can, a constricted portion has been formed between the open rim and the cylindrical portion, such that the constricted portion becomes smaller in inner diameter than the open rim and the cylindrical portion. On the constricted portion, a sealing plate is placed with a gasket interposed therebetween. Subsequently, the open rim of the metal can is pressed in the upward and downward directions and crimped so as to curl over the gasket and the sealing plate. In this method, however, the contact position within the gasket where it contacts with the peripheral portion of the sealing plate is difficult to make constant, and the contact position tend to be displaced in the upward and downward directions. Therefore, the contact position within the gasket where it contacts with the peripheral portion of the sealing plate tends to vary from place to place on the open rim in its circumferential direction. As a result of the variation, when the battery after sealing is viewed from above, the shape of the gasket (outer ring portion) in contact with the sealing plate on the upper side of the peripheral portion tends to have a distorted ring shape in which the contour of the inner circumference is not circular in shape, and the width differs from place to place in the circumferential direction of the outer ring portion.

Especially in the case where a wider outer ring portion is desired in order to provide reliable electrical insulation, if clamping is applied, with the gasket adjusted to be wider on the portion extending above the contact position with the peripheral portion of the sealing plate, the shape of the outer ring portion tends to be distorted like waving, spoiling the aesthetic appearance. Moreover, wrinkles tend to occur in the outer ring portion.

The gasket serves to electrically insulate the open rim of the battery can from the sealing plate. However, when the width of the outer ring portion is small, the insulation between the open rim of the battery can and the sealing plate is difficult to be secured. When the shape of the outer ring portion is distorted, the width of the outer ring portion is different from place to place in the circumferential direction. It may occur therefore that although the insulation between the open rim and the sealing plate can be secured at a place where the outer ring portion is wide, the insulation cannot be secured at a place where the outer ring portion is narrow.

In contrast, the present embodiment uses a sealing body comprising a sealing plate and a gasket integrally molded together. The integral molding may be done by insert molding. By using such a sealing body, the variation in width of the outer ring portion can be reduced, and the open rim of the battery and the sealing plate can be reliably insulated from each other throughout the entire circumference of the open rim. Furthermore, the outer ring portion can be adjusted wider, thereby to lengthen the insulation distance between the open rim and the sealing plate.

In the sealing body comprising a sealing plate and a gasket integrally molded together, the sealing plate and the gasket each may have any shape, and can be designed in a desired shape. The gasket has an inner ring portion disposed on the side facing the electrode body (the inner side) of the peripheral portion of the sealing plate; an outer ring portion disposed on the side opposite to the electrode body (the outer side) of the peripheral portion of the sealing plate; and a side wall portion covering the end surface of the peripheral portion of the sealing plate. In the conventional sealing method, the inner ring portion is compressed in the upward direction, and the outer ring portion is compressed in the downward direction, achieving a close contact between the gasket and the sealing plate. The inner ring portion, the outer ring portion, and the side wall portion each may have any shape, and can be designed in a desired shape.

For example, the outer ring portion may be designed to have an inner circumference whose contour shape is rotationally symmetric and/or plane symmetric in any way, such as circular, regular polygonal, or wavy curved. The outer ring portion may be designed in a shape having a function that allows fitting with other components, such as a current collector lead. Moreover, the outer ring portion or the inner ring portion may be provided at a specific position with a hole exposing the sealing plate therefrom or with a bumpy surface. The outer ring portion may be made thick at a predetermined position.

In one configuration of the sealing plate, in order to equip an explosion-proof function, a thin-walled portion having a thin thickness is provided in an annular region between the peripheral portion and the center portion. In this case, when the internal pressure of the battery increases and exceeds a threshold value, the thin-walled portion, where the strength is structurally weak, is selectively ruptured. The thin-walled portion thus acts as an explosion-proof valve. On the other hand, due to its low structural strength, the thin-walled portion is prone to break when subjected to an external impact and is susceptible to corrosion from the outside. However, by designing the shape of the outer ring portion so as to cover at least part of the thin-walled portion, the thin-walled portion can be protected against external impact and corrosion by the outer ring portion. The outer ring portion may cover 20% or more of the area of the thin-walled portion, and may cover 100% thereof.

In the conventional sealing method, as described above, there occurs a variation in the contact position within the gasket where it contacts with the peripheral portion of the sealing plate, which ma cause the thin-walled portion to be left uncovered at places in the circumferential direction. On the other hand, when the outer ring portion is adjusted wider, with the variation of the contact position taken into account, so that the thin-walled portion can be covered throughout the entire circumference of the open rim with the outer ring portion over a certain area or more, it may happen that the outer ring portion extends over the center portion of the sealing plate at places in the circumferential direction. Therefore, in the conventional sealing method using the sealing plate and the gasket as separate members, it has been difficult to adjust the outer ring portion wider toward inward of the cylinder such that the thin-walled portion is covered with the outer ring portion. However, by using a sealing body comprising a sealing plate and a gasket integrally molded together, the occurrence of the above inconvenience can be reduced.

On the other hand, when the integrally-molded sealing body is pressed and crimped via the open rim of the metal can, the gasket undergoes a tensile stress in the radial direction (direction toward the axis of the cylindrical portion) at the time of pressing. As a result cracks may occur in the outer ring portion or the inner ring portion of the gasket, and adhesion may be lost by peeling at the boundary between the outer ring portion or the inner ring portion and the sealing plate. Especially when cracks or peeling occurs in the outer ring portion, the insulation between the open rim and the sealing plate may become insufficient, or the protection against the external impact or corrosion may become insufficient.

To prevent cracks and peeling of the outer ring portion in the crimping process, the outer ring portion may have a projecting portion protruding in a direction opposite to the electrode body (in the upward direction). The protruding portion is compressed in the downward direction in the crimping process. Since the projecting portion is compressed, the tensile stress is less transmitted toward the more inner circumference side than the projecting portion, resulting in less cracks and peeling in the outer ring portion on the more inner circumference side than the projecting portion.

To enhance the adhesion between the gasket and the sealing plate, the peripheral portion may have a recessed portion on at least one of a surface facing the outer ring portion and a surface facing the inner ring portion, the recessed portion recessed in the thickness direction of the sealing plate. This can increase the surface area where the gasket is in contact with the sealing plate, and enhance the adhesion therebetween. Furthermore, this can suppress the peeling of the outer ring portion or the inner ring portion against the tensile stress applied during the crimping process.

The sealing body of the present embodiment can be preferably applicable not only to a battery with the constricted portion provided according to the conventional sealing method, but also to a battery to be sealed by a method without providing the constricted portion. Formed by integrally molding the sealing plate and the gasket together, the sealing body can be handled as one component member, which can simplify the production of a battery.

Without providing the constricted portion, the sealing can be accomplished by, for example, pressing the side wall portion of the gasket laterally via the open rim of the battery can in the radial direction of the opening (the direction toward the axis of the cylindrical portion). Specifically, a pressing portion that presses the gasket against the end surface of the peripheral portion of the sealing plate is formed in the open rim, so that the gasket is compressed, by pressing, in the radial direction of the opening between the end surface of the peripheral portion of the sealing plate and the open rim, and the repulsive force of the gasket acts to ensure the airtightness between the sealing body and the open rim.

A description will be given below of a battery according to an embodiment of the present invention with reference to the drawings. It is to be noted, however, the present invention is not limited thereto.

First Embodiment

Figure 2:
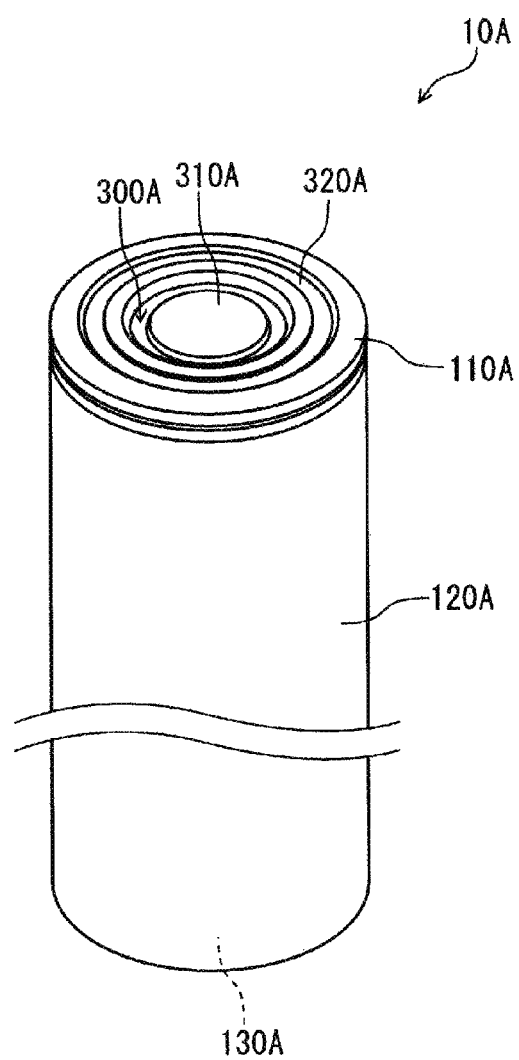
FIG. 2 An oblique view showing an appearance of a battery can in the battery.

FIG. 1 is a schematic vertical cross-sectional view of an essential part of a battery OA according to the present embodiment. FIG. 2 is an oblique view of the battery. The battery 10A is circular cylindrical in shape, and includes a circular cylindrical bottomed battery can 100A, a circular cylindrical electrode body 200 housed in the can, and a sealing body 300A sealing the opening of the battery can 100A.

The battery can 100A has: a cylindrical portion 120A housing the electrode body 200; a bottom wall 130A closing one end of the cylindrical portion 120A; and an open rim 110A continuing to the other end of the cylindrical portion 120A. The opening defined by the open rim 110A is closed by the sealing body 300A.

The sealing body 300A includes a sealing plate 310A and a gasket 320A disposed at a peripheral portion 311A of the sealing plate 310A. The sealing plate 310A is circular-shaped or disk-shaped and has an explosion-proof function. Specifically, the sealing plate 310A has the peripheral portion 311A and a center region 312A, both having a thick wall thickness and serving to provide structural strength, and a thin-walled portion 313A configured to exhibit an explosion-proof function. The thin-walled portion 313A is provided in a region between the peripheral portion 311A and the center region 312A. To the inner surface of the center region 312A, one end of a lead wire 210 extended from a positive electrode or a negative electrode constituting the electrode body 200 is connected. Thus, the sealing plate 310A functions as a terminal of one electrode.

When the internal pressure of the battery can 100A increases, the sealing plate 310A bulges outward, and the stress due to tension is concentrated, for example, on the boundary between the peripheral portion 311A and the thin-walled portion 313A, causing a break to occur from the boundary. As a result, the internal pressure of the battery can 100A is released, and the safety of the battery 10A can be ensured.

The gasket 320A has an outer ring portion 321A and an inner ring portion 322A, and a side wall portion 323A connecting the outer ring portion 321A with the inner ring portion 322A. The end surface 311T of the peripheral portion 311A of the sealing plate 310A is covered with the side wall portion 323A.

The outer ring portion 321A, the inner ring portion 322A, and the side wall portion 323A are formed as an integrally molded product. The gasket 320A can be integrally molded with the sealing plate 310A, for example, by insert molding.

The outer ring portion 321A extends inward in the radial direction beyond the inner ring portion 322A. The outer ring portion 321A covers at least part of the thin-walled portion 313A of the sealing plate 310A. The outer ring portion 321A thus serves to protect the thin-walled portion 313A against external impact and corrosion, and can increase the insulating distance between the open rim 110A and the sealing plate 310A.

A constricted portion 140 having an inner diameter smaller than that of the cylindrical portion of an open rim 110A and that of the cylindrical portion 120A is provided between the cylindrical portion 120A of the battery can 100A and the open rim 110A. In short, the open rim 110A is continuous with the cylindrical portion 120A through the constricted portion 140. The constricted portion 140 comprises a first constricted portion 141a whose inner diameter continuously decreases from the cylindrical portion 120A, and a second constricted portion 141b whose inner diameter continuously decreases from the open rim 110A and is continuous with the first constricted portion 141a at a place where the inner diameter becomes the smallest. The inner ring portion 322A of the gasket is in contact with the second constricted portion 141b.

One end of the open rim 110A is continuous with the second constricted portion 141b. The other end 110E of the open rim 110A constitutes an open end, and is bent inward and in contact with the outer ring portion 321A.

The inner ring portion 322A is compressed in the upward direction via the second constricted portion 141b, and the outer ring portion 321A is compressed in the downward direction via the other end 110E of the open rim 110A, and thereby, the repulsive force of the gasket acts to bring the sealing body and the open rim into hermetic contact with each other.

Figure 3:
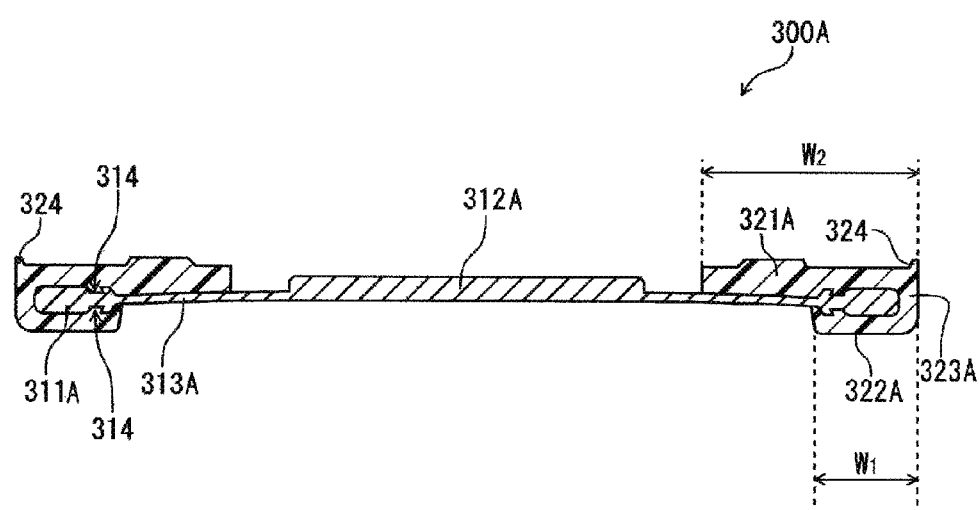
FIG. 3 A cross-sectional view showing a cross-sectional shape of a sealing body used in the battery.

FIG. 3 is a schematic cross-sectional view of an exemplary configuration of the sealing body 300A as one component member, before sealing the battery can 100A with the sealing body 300A to form the battery 10A. The sealing body 300A has, as described above, the sealing plate 310A and the gasket 320A. The gasket 320A has a projecting portion 324 provided in the outer ring portion 321A, the projecting portion protruding in the upward direction.

The projecting portion 324 is not shown in FIG. 1 because it is compressed in the downward direction in a crimping processing when sealing the battery can. However, since the projecting portion 324 is compressed in the crimping processing, the tensile stress is less transmitted toward the outer ring portion 321A on the more inner circumference side than the projecting portion 324, resulting in less cracks and peeling in the outer ring portion.

The sealing plate 310A has recessed portions 314 in the peripheral portion 311A provided on a surface facing the outer ring portion 321A and on a surface facing the inner ring portion 322A.

The recessed portions 314 serve, when, for example, integrally molding the sealing plate 310A and the gasket 320A into a sealing body, to increase the surface area where the gasket 320A is in contact with the sealing plate 310A and thereby to enhance the adhesion between the gasket 320A and the sealing plate 310A. Moreover, against the tensile stress applied during the crimping processing, the peeling of the outer ring portion or the inner ring portion can be suppressed.

The recess of each recessed portion 314 may be inclined with respect to the thickness direction of the sealing plate (see FIG. 3). In this case, the recessed portion 314 acts like a hook. This can enhance the adhesion between the gasket 320A and the sealing plate 310A, and prevent the gasket 320A from being peeled off from the sealing plate 310A by the impact or the like during transport or assembly.

The inner ring portion has a width $W_1$ and the outer ring portion has a width $W_2$, both of which can be constant over the entire circumference of the sealing body, and can be $W_2 > W_1$.

Second Embodiment

The battery may further include an electrically conductive cap covering at least part of the open rim and electrically connected to the open rim, the cap being electrically insulated from the sealing plate. This can reduce the space necessary for wiring in the battery.

In the conventionally-configured battery, usually, the battery can functions as an external terminal of one electrode, and the sealing body functions as an external terminal of the other electrode. Electric current from the electrode with the same potential as the battery can is collected from the bottom of the battery can. On the other hand, electric current from the electrode with the same potential as the sealing plate is collected from the sealing plate placed opposite to the bottom of the battery can. In other words, when connecting external lead wires respectively to the electrodes, one external lead wire is extended from the undersurface of the battery, and the other external lead wire is extended from the top surface of the battery. Therefore, a space for wiring is necessary in the upward and downward directions.

In the battery of the present embodiment, the sealing body functions as an external terminal of one electrode (e.g. positive electrode) of the battery. The sealing body has a first principal surface facing the interior of the battery can, a second principal surface opposite to the first principal surface, and a side surface connecting the first principal surface with the second principal surface. On the other hand, the cap connected to the battery can is on the open rim side, and functions as an external terminal of the other electrode (e.g., negative electrode) of the battery. Therefore, electric current from the electrodes can be both collected in the vicinity of the sealing body (e.g., on the second principal surface side). Accordingly, a space (wiring space) for arranging a lead wire connected to each external terminal is only necessary to be present on the sealing body side, which can save the wiring space. Moreover, the cap is an accessary part of the battery, which is a separate member from the battery can. The cap can be therefore formed in any shape that suits the use and shape of the battery. Therefore, the present embodiment is applicable regardless of the shape of the battery (battery can).

The cap may have a first portion covering at least part of the side surface of the sealing body, with the open rim of the battery can therebetween. This increases the contact area with the battery can and improves the current-collecting ability. The cap may have a second portion covering at least part of an outer periphery of the second principal surface of the sealing body. This makes it easy to collect current from both electrodes on the second principal surface side of the sealing plate. The open rim of the battery can may be present between the second portion and the second principal surface of the sealing body.

The cap may have both the first portion and the second portion. In other words, the cap may have an approximately L-shaped cross-section in the axial direction (hereinafter, sometimes referred to as Z direction) of the battery can. By shaping like this, the cap is fixedly secured to the battery can, and moreover, the contact area with the battery is increased and a current-collecting ability can be increased. Furthermore, the edge of the battery on the second principal surface side can be protected with the cap.

When the cap includes the first portion having an annular shape, in a no-load state, the first portion may have a minimum inner diameter smaller than the maximum outer diameter of a portion of the open rim, the portion to be covered with the cap. By press-fitting such a cap onto the battery, the cap is more fixedly secured to the battery.

The cap may be welded to the open rim of the battery can. In this case, the cap is more fixedly secured to the battery, and, moreover, the resistance is lowered, and the current-collecting ability can be improved. Welding may be performed by any method, which can be selected as appropriate according to the material of the cap and the open rim. Examples of the welding method include laser welding and resistance welding. As a method other than welding, for example, a thread machining may be applied to the inside of the cap, and another thread machining may be applied to the battery at the connecting portion with the cap, so as to correspond to the thread on the cap. By mating the threads, the cap can be fastened to the battery can. A thread machining ma be applied only on either the cap or the battery can. In this case also, the cap can be secured to the battery can.

The cap is useful especially when the end surface of the open rim is on the side surface of the sealing body, that is, when the open rim of the battery can does not cover the second principal surface of the sealing body. Usually, in this case, current from both electrodes cannot be collected on the second principal surface side of the sealing body. However, by using the cap electrically connected to the battery can, current from both electrodes can be collected on the second principal surface side of the sealing plate.

When the end surface of the open rim is on the side surface of the sealing body, the open rim is preferably smaller in outer diameter at the lowest position in contact with the sealing body, than the cylindrical portion, in the height direction of the battery can. In this case, the cap can be designed in such a thickness that the outer diameter of the cap becomes almost equal to the outer diameter of the cylindrical portion. In other words, even in a state where the cap is fitted onto the battery can, the changes in the diameter of the battery in the axial direction can be reduced.

A detailed description will be given below of a battery according to an embodiment of the present invention, the battery including the cap, with reference to the drawings. It is to be noted, however, that the present invention is not limited thereto.

Figure 4:
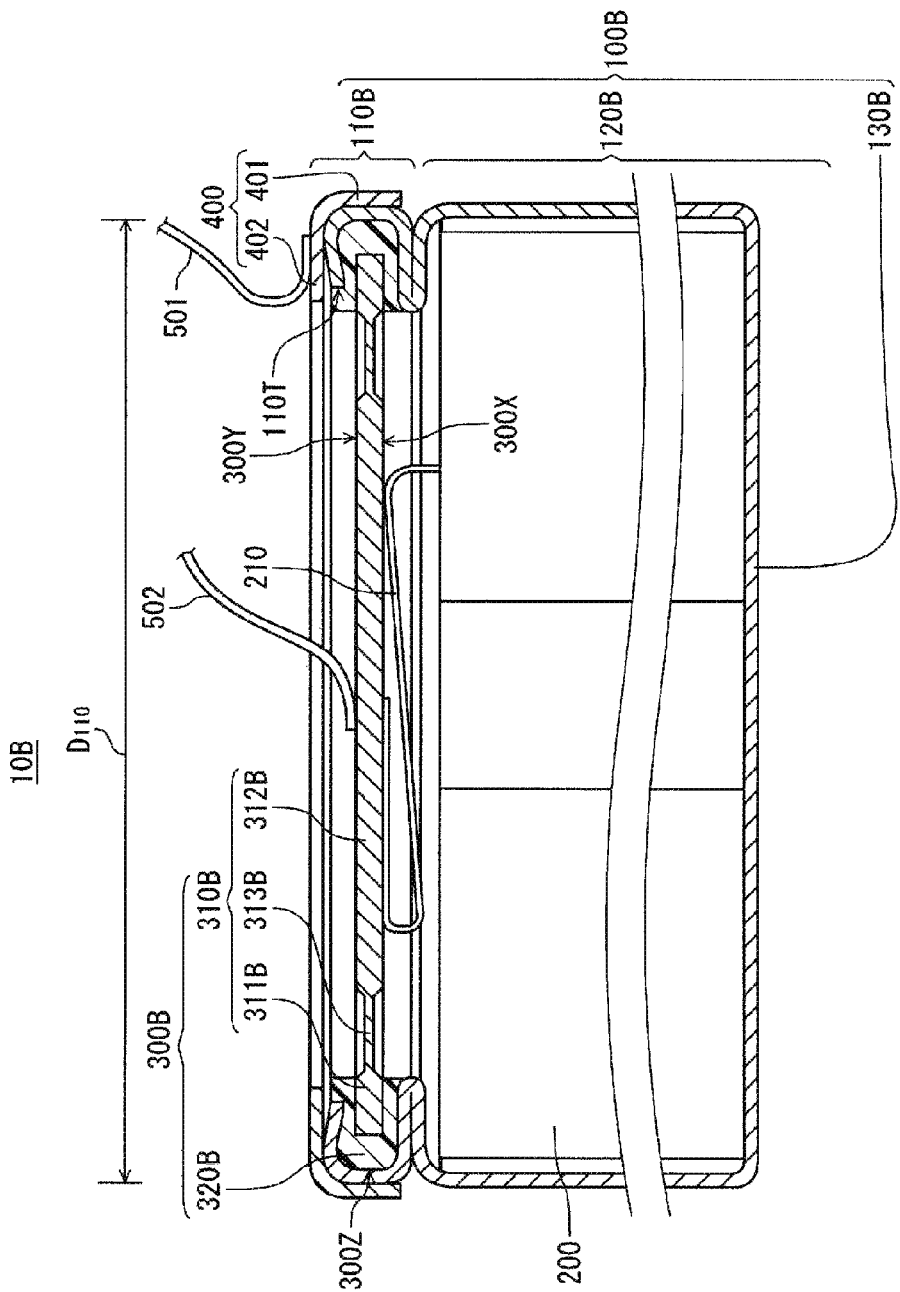
FIG. 4 A schematic vertical cross-sectional view of a battery according to another embodiment of the present invention.
Figure 5A:
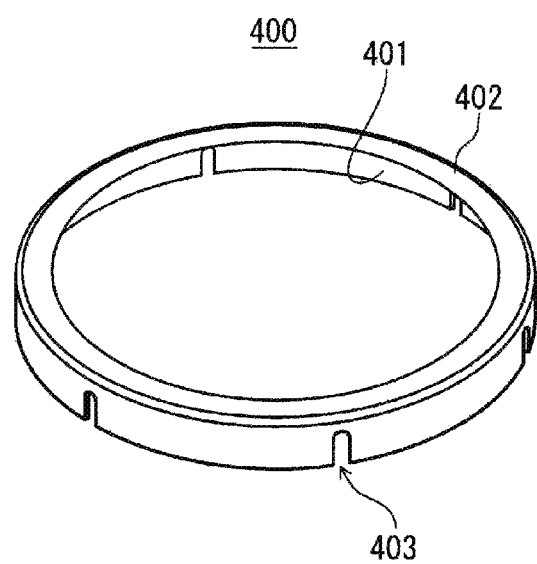
FIG. 5A A schematic oblique view of a cap according to another embodiment of the present invention.
Figure 5B:
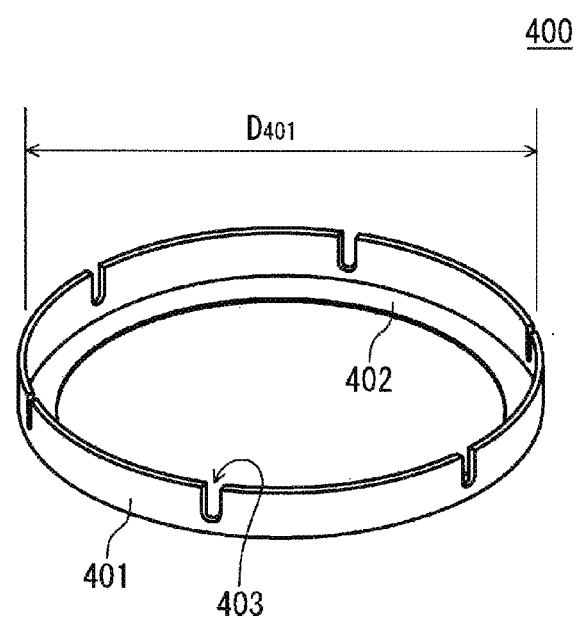
FIG. 5B An oblique view of the cap of FIG. 5A as viewed from the side opposite to FIG. 5A.

FIG. 4 is a schematic vertical cross-sectional view of a battery 10B according to the present embodiment. FIG. 5A is a schematic oblique view of a cap according to the present embodiment. FIG. 5B is an oblique view of the cap as viewed from the side opposite to FIG. 5A.

The battery 10B is circular cylindrical in shape, and includes a circular cylindrical bottomed battery can 100B, the circular cylindrical electrode body 200 housed in the battery can 100B, a sealing body 300B sealing an opening of the battery can 100B, and an electrically conductive and annular cap 400 electrically connected to the battery can 100B and electrically insulated from the sealing body 300B.

The battery can 100B has: a cylindrical portion 120B housing the electrode body 200; a bottom wall 130B closing one end of the cylindrical portion 120B; and an open rim 110B continuing to the other end of the cylindrical portion 120B. The opening defined by the open rim 110B is closed by a sealing body 300B.

The sealing body 300B has a first principal surface 300X facing the interior of the battery can 100B, a second principal surface 300Y opposite to the first principal surface 300X, and a side surface 300Z connecting the first principal surface 300X with the second principal surface 300Y. An end surface 110T of the open rim 110B is on the second principal surface 300Y of the sealing body 300, and part of the open rim 110B covers the outer periphery of the second principal surface 300Y.

The sealing body 300B includes a sealing plate 310B and a gasket 320B disposed at a peripheral portion 311B of the sealing plate 310B. The sealing plate 310B is circular-shaped or disk-shaped, and has an explosion-proof function. Specifically, the sealing plate 310B has the peripheral portion 311B and a center region 312B, both having a thick wall thickness and serving to provide structural strength, and a thin-walled portion 313B configured to exhibit an explosion-proof function. The thin-walled portion 313B is provided in an annular region between the peripheral portion 311B and the center region 312B. To the inner surface of the center region 312B, one end of the lead wire 210 extended from a positive electrode or a negative electrode constituting the electrode body 200 is connected. Thus, the sealing plate 310B functions as a terminal of one of the electrodes. Note that the shape of the sealing body 300B is not limited thereto.

When the internal pressure of the battery can 100B increases, the sealing plate 310B bulges outward, and the stress due to tension is concentrated, for example, on the boundary between the peripheral portion 311B and the thin-walled portion 313B, causing a break to occur from the boundary. As a result, the internal pressure of the battery can 100B is released, and the safety of the battery 10B can be ensured.

The cap 400 has a first portion 401 covering a side surface 300Z of the sealing body 300B, with the open rim 110B of the battery can 100B therebetween, and a second portion 402 covering an outer periphery of the second principal surface 300Y of the sealing body 300B.

In view of not disturbing the explosion-proof function, the second portion 402 of the cap 400 preferably does not cover the thin-walled portion 313B, and more preferably does not cover the boundary between the peripheral portion 311B and the thin-walled part 313B. The second portion 402 covers, for example, only part of the peripheral portion 311B.

The cap 400 is electrically conductive, and has the same polarity as that of the battery can 100B. So, the cap 400 can be configured to function as a terminal having a polarity different from that of the sealing body 300B (sealing plate 310B). Thus, current from the electrodes of the battery 10B can be both collected on the second principal surface 300Y side of the sealing body 300B. In other words, regardless of the form of the open rim 110B of the battery can 100B, each external lead wire can be extended from the second principal surface 300Y side. The cap 400 is electrically insulated from the sealing plate 310B b, for example, the gasket 320B. FIG. 5 illustrates an example in which a first external lead wire 501 is connected to the second portion 402 of the cap 400, and a second external lead wire 502 is connected to an outer surface of the center region 312B of the sealing plate 310B.

In a no-load state, the first portion 401 of the cap 400 has a minimum inner diameter $D_{401}$ (see FIG. 5B) smaller than a maximum outer diameter $D_{110}$ of a portion of the open rim 110B to be covered with the first portion 401. The battery 10B is press-fitted into the cap 400, and the cap 400 is fixedly secured to the battery 10B. In view of the securing fixedness, $D_{401}/D_{110}$ may be 0.99 or less, and may be less than 0.98 or less. On the other hand, in view of the ease of press-fitting, $D_{401}/D_{110}$ is preferably 0.9 or more.

The first portion 401 of the cap 400 may be provided with one or more notches 403.

The cap 400 is welded to the open rim 110B. Preferably, the first portion 401 is welded to the open rim 110B.

Third Embodiment

Figure 6A:
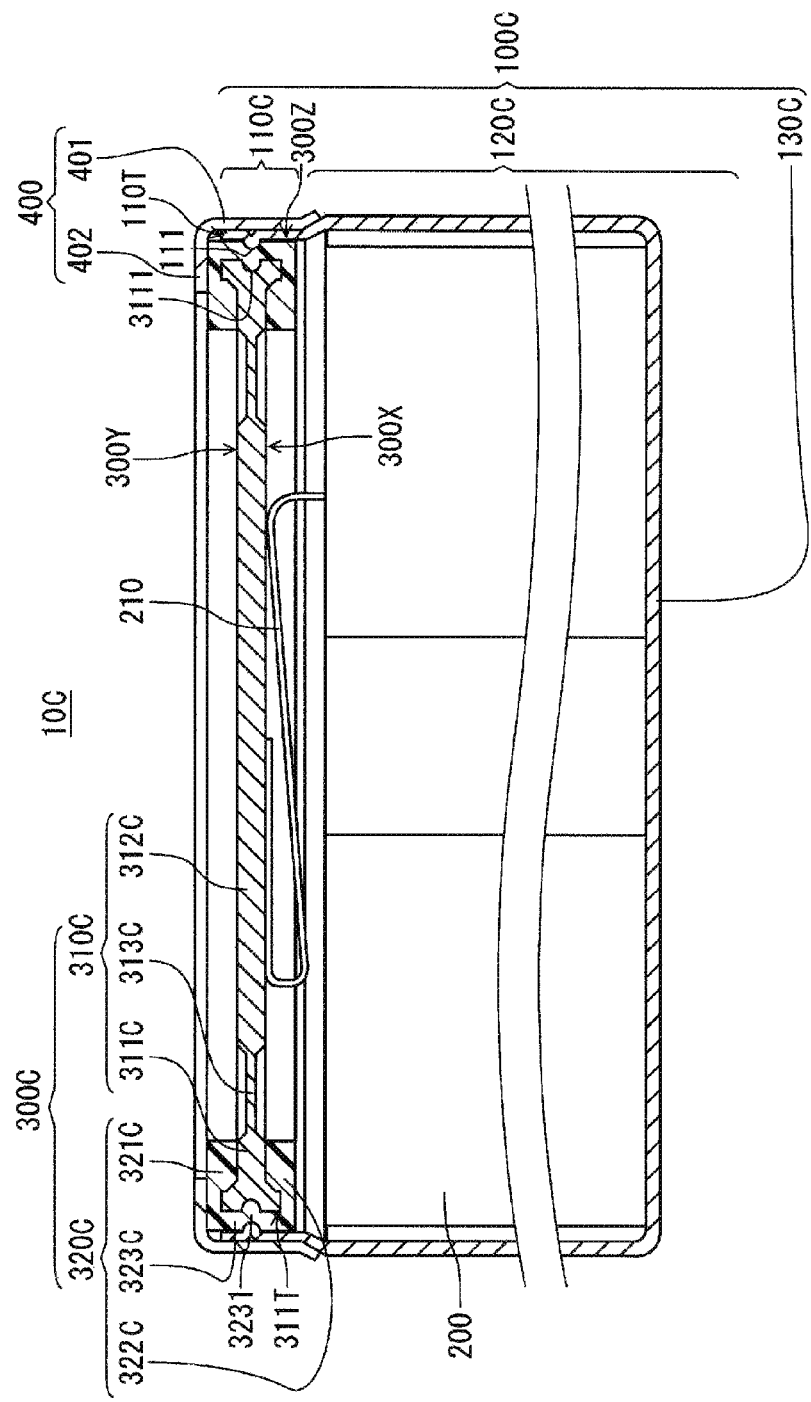
FIG. 6A A schematic vertical cross-sectional view of a battery according to yet another embodiment of the present invention.
Figure 6B:
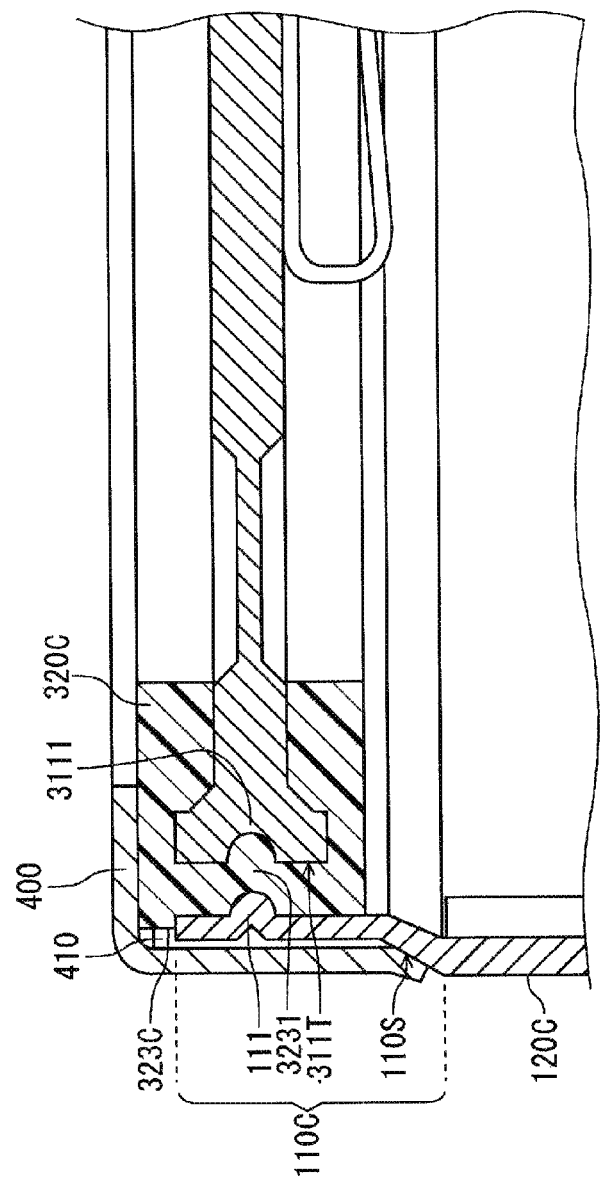
FIG. 6B A schematic vertical cross-sectional view of an essential part of the battery of FIG. 6A.
Figure 6C:
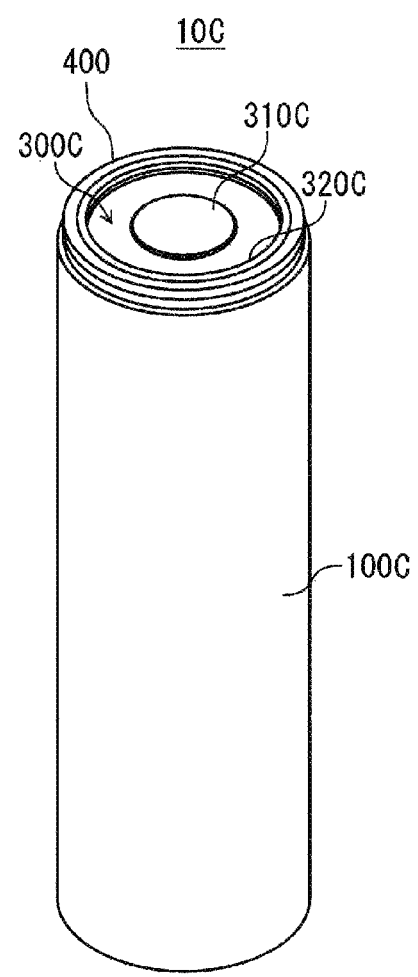
FIG. 6C An oblique view of the battery of FIG. 6A.

FIG. 6A is a schematic vertical cross-sectional view of a battery 10C including the cap 400 according to the present embodiment. FIG. 6B is a schematic vertical cross-sectional view of an essential part of the battery of FIG. 6A. FIG. 6C is an oblique view of the battery of FIG. 6A.

The end surface 110T of an open rim 110C of a battery can 100C is on the side surface 300Z of a sealing body 300C, and the open rim 110C does not cover the outer periphery of the second principal surface 300Y of the sealing body 300C.

By using the cap 400, even when the open rim 110C does not cover the second principal surface 300Y, current can be collected from both electrodes in the vicinity of the sealing body 300C, further, on the second principal surface 300Y side. A joining material 410 having electrical conductivity may be interposed between the first portion 401 of the cap 400 and the outer surface of the open rim 110C.

The open rim 110C of the battery can 100C may be smaller in outer diameter at the lowest position in contact with the sealing body 300C, than the cylindrical portion 120C, in the height direction of the battery can 100C. For example, the open rim 110C may has a tapered region 110S where the outer diameter of the cylindrical portion 120C is gradually reduced (see FIG. 6B), at the boundary with the cylindrical portion 120C. The tapered region 110S forms an angle of, for example, less than 45° with respect to the Z direction.

In this case, the cap 400 can be designed in such a thickness that the outer diameter of the cap 400 becomes almost equal to the outer diameter of the cylindrical portion 120C. This can reduce the changes in the diameter of the battery 10C in the Z direction. The difference between the outer diameter or the maximum outer diameter of the cap 400 and the outer diameter or the maximum outer diameter of the cylindrical portion 120C is, for example, 20% or less of the outer diameter of the cylindrical portion 120C. The difference may be 10% or less, and may be 5% or less or 2% or less or 1% or less.

When the first portion 401 of the cap 400 covers at least part of the tapered region 110S, the cap 400 and the open rim 110C may be welded within the tapered region 110S. This can make the positioning easy, and suppress a heat-caused deterioration of the gasket 320C.

In the present embodiment, at least part of the open rim 110C preferably presses a side wall portion 323C of a gasket 320C against the end surface 311T of a peripheral portion 311C of a sealing plate 310C, so that the side wall portion 323C is compressed in the radial direction of the opening. In this way, the airtightness between the open rim 110C of the battery can 100C and the sealing body 300C can be easily ensured. For example, the open rim 110C presses the gasket 320C not in the Z direction but in the direction perpendicular to the Z direction (hereinafter, sometimes referred to as XY direction). In this case, given that the pressing force of the open rim 110C exerted on the gasket 320C is decomposed in two directions: Z and XY, the scalar quantity of the vector in the XY direction is larger than that in the Z direction.

A description will be given below of the sealing plate 310C, the gasket 320C, and the open rim 11C that are suitably applicable to the case where the open rim 110C presses the gasket 320C in the XY direction. The configuration other than these may be the same as in the second embodiment.

The gasket 320C has an outer ring portion 321C and an inner ring portion 322C, and a side wall portion 323C connecting the outer ring portion 321C with the inner ring portion 322C. The end surface 311T of the peripheral portion 311C of the sealing plate 310C is covered with the side wall portion 323C. The outer ring portion 321C and the inner ring portion 322C sandwich the peripheral portion 311C of the sealing plate 310C therebetween, and thereby the gasket 320C is secured to the sealing plate 310C.

The open rim 110C of the battery can 100C is smaller in outer diameter at the lowest position in contact with the inner ring portion 322C of the gasket 320C, than the cylindrical portion 120C, in the height direction of the battery can 100C of the battery 10C. The outer ring portion 321C protrudes in the axial direction (Z direction) of the battery can 100C beyond the end surface 110T of the open rim 110C. In this case also, the cap 400 is useful. Usually, in this case, the gasket 320C becomes an obstacle, making it difficult to collect current from both electrodes on the second principal surface 300Y side of the sealing body 300C. However, by using the cap 400, current can be easily collected from both electrodes on the second principal surface 300Y side.

The outer ring portion 321C, the inner ring portion 322C, and the side wall portion 323C are formed as an integrally molded product. The gasket 320C can be integrally molded with the sealing plate 310C, for example, by an insert molding technique. According to the integral molding, the sealing plate 310C and the gasket 320C are easily brought into close contact with each other. Formed by integrally molding the sealing plate 310C and the gasket 320C together, the sealing body 300C can be handled as one component member, which can simplify the production of the battery 10C.

In FIG. 6A, a projection 111 constricted inward is formed on the inner side of the open rim 110C, along the circumferential direction of the opening. This projection 111 presses the side all portion 323C against the end surface 311T. The side wall portion 323C of the gasket 320C may be provided with a recessed portion 3231 in advance at a position corresponding to the projection 111. Providing the recessed portion 3231 on the gasket 320C can prevent the gasket 320C from being excessively deformed when the side wall 323C is compressed.

The projection 111 may be formed intermittently in a plurality of numbers along the circumferential direction of the opening, or may be formed continuously along the circumferential direction of the opening. The continuously formed projection 111 can form an annular groove along the circumferential direction of the opening. The projection(s) 111 can press the gasket 320C or its side wall portion 323C more strongly toward the end surface 311T of the peripheral portion 311C of the sealing plate 310C. In this way, the airtightness between the sealing body 300C and the open rim 110C can be more reliably ensured. When the projection 111 is formed intermittently in a plurality of numbers, the projections 111 (at least two, preferably four or more projections) are provided preferably at equi-angular intervals with respect to the center of the opening.

In the height direction of the battery can 100C, the projection 111 is preferably substantially equal in position to the center of the end surface 311T. By aligning like this, the deformation of the sealing plate 310C and the gasket 320C can be suppressed. Moreover, the pressure applied to the gasket 320C or its side wall portion is unlikely to be non-uniform. Accordingly, the deformation of the gasket 320C tends to be suppressed, and the gasket 320C can be compressed to a higher degree. This can more reliably ensure the airtightness between the sealing body 300C and the open rim 110C.

Here, that the projection 111 is substantially equal in position to the center of the end surface 311T of the sealing plate 310C means that, in the height direction of the battery can 100C, the difference between the position of the projection 111 and the center position of the end surface 311T of the sealing plate 310C is 4% or less of a height H of the battery can 100C.

A recessed groove 3111 is formed at the center position of the end surface 311T of the peripheral portion 311C so as to correspond to the projection 111 of the open rim 110C. In the height direction of the battery can 100C, the difference between the center position of the recessed groove 3111 and the position of the projection 111 is 4% or less of the height H of the battery can 100C.

According to the above configuration, it is not necessary to press the gasket in the Z direction for hermetically sealing the battery can. This eliminates the necessity of providing the battery can 100C with a constricted portion interposed between the gasket and the electrode body as shown in FIGS. 1 and 4. In this case, the shortest distance between the sealing body 300C and the electrode body 200 can be set to, for example, 2 mm or less, and preferably 1.5 mm or less, more preferably 1 mm or less.

The battery cans 100A, 100B and 100C may be made of any material. Examples of the material include iron and/or an iron alloy (including stainless steel), copper, aluminum, and an aluminum alloy (including an alloy containing a trace amount of other metals, such as manganese and copper). The cap 400 also may be made of any material, examples of which include those of the battery cans 100A and 100B.

The gaskets 320A, 320B, and 320C may be made of any material, but in view of ease of integral molding, examples of the material that can be preferably used include polypropylene (PP), polyphenylene sulfide (PPS), polyethylene (PE), polybutylene terephthalate (PBT), perfluoroalkoxyalkane (PFA), polytetrafluoroethylene (PTFE), and polyamide (PA).

Next, an illustrative description will be given of a configuration of the electrode body 200, with a lithium ion secondary battery taken as an example.

The cylindrical electrode body 200 is of a wound type, and is formed by spirally winding a positive electrode and a negative electrode with a separator interposed therebetween. To one of the positive and negative electrodes, a lead wire 210 is connected. The lead wire 210 is connected to the inner surface of the center region of the sealing plate by welding or the like. To the other one of the positive and negative electrodes, another lead wire is connected. The another lead wire is connected to the inner surface of the battery can by welding or the like.

(Negative Electrode)

The negative electrode has a belt-like negative electrode current collector and a negative electrode active material layer formed on both sides of the negative electrode current collector. The negative electrode current collector is, for example, a metal film, a metal foil, or the like. The material of the negative electrode current collector is preferably at least one selected from the group consisting of copper, nickel, titanium, alloys thereof and stainless steel. The negative electrode current collector preferably has a thickness of for example, 5 to 30 µm.

The negative electrode active material layer contains a negative electrode active material, and optionally contains a binder and an electrically conductive material. The negative electrode active material layer may be a deposition film formed by a gas phase method (e.g., vapor deposition). Examples of the negative electrode active material include Li metal, a metal or an alloy that electrochemically reacts with Li, a carbon material (e.g graphite), a silicon alloy, a silicon oxide, and a metal oxide (e.g., lithium titanate). The negative electrode active material layer preferably has a thickness of, for example, 1 to 300 µm.

(Positive Electrode)

The positive electrode has a belt-like positive electrode current collector and a positive electrode active material layer formed on both sides of the positive electrode current collector. The positive electrode current collector is, for example, a metal film, a metal foil (stainless steel foil, aluminum foil, or aluminum alloy foil), or the like.

The positive electrode active material layer contains a positive electrode active material and a binder, and optionally contains an electrically conductive material. The positive electrode active material is not limited, but may be a lithium-containing composite oxide, such as $LiCoO_2$ or $LiNiO_2$. The positive electrode active material layer preferably has a thickness of, for example, 1 to 300 µm.

Examples of the conductive material contained in each active material layer include graphite and carbon black. The conductive material is contained in an amount of, for example, 0 to 20 parts by mass per 100 parts by mass of the active material. Examples of the binder contained in the active material layer include fluorocarbon resin, acrylic resin, and rubber particles. The binder is contained in an amount of, for example, 0.5 to 15 parts by mass per 100 parts by mass of the active material.

(Separator)

The separator is preferably a microporous resin film or a nonwoven resin fabric. Examples of the material (resin) of the separator include polyolefin, polyamide, and polyamide imide. The separator has a thickness of, for example, 8 to 30 µm.

(Electrolyte)

The electrolyte may be a non-aqueous solvent in which a lithium salt is dissolved. Examples of the lithium salt include $LiCO_4$, $LiBF_4$, $LiPF_6$, $LiCF_3SO_3$, $LiCF_3CO_2$, and imide salts. Examples of the non-aqueous solvent include: cyclic carbonic esters, such as propylene carbonate, ethylene carbonate, and butylene carbonate; chain carbonic esters, such as diethyl carbonate, ethyl methyl carbonate, and dimethyl carbonate; and cyclic carboxylic acid esters, such as γ-butyrolactone and γ-valerolactone.

Although a description is given above with a lithium ion secondary battery taken as an example, the present invention is applicable to a battery including a battery can which is sealed with a sealing body, regardless of whether the battery is a primary or secondary battery.

INDUSTRIAL APPLICABILITY

The battery according to the present invention is applicable to batteries of various shapes of cans, and is suitably applicable as a power source for, for example, portable devices, hybrid vehicles, electric vehicles, and the like.

Although the present invention has been described in term of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST 10A, 10B, 10C: battery
100A, 100B, 100C: battery can
  110A, 110B, 110C: open rim
    110E: end
    110S: tapered region
    110T: end surface
    111: projection
  120A, 120B, 120C: cylindrical portion
  130A, 130B, 130C: bottom wall
  140: constricted portion
    141a: first constricted portion
    141b: second constricted portion
200: electrode body
210: lead wire
300A, 300B, 300C: sealing body
  300X: first principal surface
  300Y: second principal surface
  300Z: side surface
  310A, 310B, 310C: sealing plate
    311T: end surface
    311I: recessed groove
    311A, 311B, 311C: peripheral portion
    312A, 312B, 312C: center region
    313A, 313B, 313C: thin-walled portion
    314: recessed portion
  320A, 320B, 320C: gasket
    321A, 321B, 321C: outer ring portion
    322A, 322B, 322C: inner ring portion
    323A, 323B, 323C: side wall portion
      3231: recessed portion
    324: projecting portion
  400: cap
    401: first portion
    402: second portion
    403: notch
    410: joining material
    501: first external lead wire
    502: second external lead wire

The invention claimed is:

1. A battery comprising:
a battery can including a cylindrical portion, a bottom wall closing one end of the cylindrical portion, a constricted portion, and an open rim, the open rim continuing to the other end of the cylindrical portion via the constricted portion; an electrode body housed in the cylindrical portion; and a sealing body fixed to the open rim so as to seal an opening defined by the open rim, the sealing body including a sealing plate, and a gasket disposed at a peripheral portion of the sealing plate, wherein the sealing body has a first principal surface facing an interior of the battery can, a second principal surface opposite to the first principal surface, and a side surface connecting the first principal surface with the second principal surface, the battery further comprising a cap with electrical conductivity covering at least part of the open rim and directly in contact with an uppermost portion of the open rim, the cap being electrically insulated from the sealing plate, the cap is welded to the open rim of the battery can at a position above the constricted portion, and in a height direction of the battery can, a lower end of the cap is positioned on the open rim side relative to an upper end of the constricted portion.

2. The battery according to claim 1, wherein the constricted portion has an inner diameter smaller than an inner diameter of the open rim and an inner diameter of the cylindrical portion and is provided between the open rim and the cylindrical portion.

3. The battery according to claim 1, wherein the cap has a first portion covering at least part of the side surface of the sealing body, with the open rim of the battery can between the first portion and the side surface.

4. The battery according to claim 1, wherein the cap has a second portion covering at least part of an outer periphery of the second principal surface of the sealing body.

5. The battery according to claim 1, wherein the gasket is an electrically insulating member and is interposed between the cap and the sealing plate, and the gasket is disposed so as to extend more inward than the cap in a radial direction.

6. The battery according to claim 1, wherein the gasket has an inner ring portion disposed on the peripheral portion on a side facing the electrode body, an outer ring portion disposed on the peripheral portion on a side opposite to the side facing the electrode body, and a side wall portion covering an end surface of the peripheral portion, and the sealing plate and the gasket are integrally molded to be in close contact with each other.

7. The battery according to claim 1, wherein the cap only contacts the open rim of the battery can, and the open rim is wholly disposed above the constricted portion in a height direction of the battery can.

8. The battery according to claim 1, wherein the cap has a first portion and a second portion, the first portion covering at least part of the side surface of the sealing body, with the open rim of the battery can between the first portion and the side surface, the second portion covering at least part of an outer periphery of the second principal surface of the sealing body, and an end portion of the open rim has an inclined portion, the inclined portion being disposed between the gasket and the second portion and in a region that overlaps the constricted portion when viewed from the height direction of the battery can, and the inclined portion is inclined so as to become distant from the second portion and approach the constricted portion, as going radially inward of the battery can.

9. The battery according to claim 3, wherein the first portion of the cap has an annular shape, and in a no-load state, the first portion of the cap has a minimum inner diameter smaller than a maximum outer diameter of a portion of the open rim of the battery can, the portion to be covered with the cap.

10. The battery according to claim 6, wherein the sealing plate is provided, between the peripheral portion and a center portion, with a thin-walled portion smaller in thickness than the peripheral portion and the center portion, and the outer ring portion covers at least part of the thin-walled portion.

11. The battery according to claim 6, wherein the outer ring portion has an inner circumference whose contour shape is rotationally symmetric and/or plane symmetric.

12. The battery according to claim 6, wherein the outer ring portion has a projecting portion protruding in a direction opposite to the electrode body, and the projecting portion is compressed in an axial direction of the cylindrical portion by the open rim.

13. The battery according to claim 6, wherein the peripheral portion has a recessed portion on at least one of a surface facing the outer ring portion and a surface facing the inner ring portion, the recessed portion recessed in the thickness direction of the sealing plate, and a space defined by the recessed portion is filled with the outer ring portion or the inner ring portion.

* * * * *